Patented July 23, 1935

2,008,796

UNITED STATES PATENT OFFICE 2,008,796

ANTHRAQUINONE DYESTUFFS AND PROCESS FOR THEIR MANUFACTURE

Albin Peter, Basel, Switzerland, assignor to the firm of Chemical Works formerly Sandoz, Basel, Switzerland No Drawing. Application May 3, 1934, Serial No. 723,800. In Switzerland August 17, 1933

27 Claims. (Cl. 260—64)

The present invention relates to new anthraquinone dyestuffs which possess very valuable properties and to a process for the manufacture of said dyestuffs.

It has been found that new anthraquinone dyestuffs can be prepared by treating with aldehydes of the aliphatic and aromatic series such arylaminoanthraquinones that contain a free 4'-position in the aryl nucleus. Such arylaminoanthraquinones possess, therefore, the following general formula:

wherein A represents a substituted or unsubstituted anthraquinone nucleus and R a substituted or unsubstituted benzene or naphthalene nucleus, that contains a free para-position to the —NH— group. The arylaminoanthraquinones which can be used in the present process may contain in the anthraquinone and aryl nucleus substituents such as amino, substituted amino, hydroxy, halogen, sulpho and alkyl groups or chains linking one 1-carbon to a 9-carbon of the anthraquinone nucleus, as this occurs in the case of anthrapyridones, anthrapyrimidones and anthrapyrimidines.

Such compounds are for instance 1-phenylaminoanthraquinone, 1-amino-4-phenylamino-anthraquinone, 1-amino-2-sulpho-4-phenylamino-anthraquinone, 1-amino-2-methyl- or (2-cyano)-4-phenylaminoanthraquinone, 1-amino-2-bromo-4-phenylaminoanthraquinone, 1-amino-2-bromo-5-chloro-4-phenylaminoanthraquinone, 1-amino-4-α-naphthylaminoanthraquinone-2-sulphonic acid, carbethoxy-2-sulpho-4-phenylamino-1-9-anthrapyridone and also such compounds that are substituted in the aryl nucleus, such as 1-amino-2-sulpho-4-(3'-chlorophenyl)-amino-anthraquinone, 1-amino-2-sulpho-4-(2'-methoxyphenyl)- or -(-3'methylphenyl)-anthraquinone.

As aldehydes compounds such as formaldehyde, acetaldehyde, benzaldehyde, aminobenzaldehyde, nitro- or chlorobenzaldehyde and benzaldehyde sulphonic acids can be used.

By treating the above said anthraquinone compounds with aldehydes new condensation products are formed. The reaction which takes place in this treatment may be represented by the following scheme The new products obtained are, therefore, derivatives of di- or triphenylmethane according to the aldehyde used for the condensation. The preparation of the new compounds can be carried out by treating the above said arylaminoanthraquinones with aldehydes or with compounds yielding aldehydes in a suitable solvent and in a neutral or acid medium. This treatment can be carried out under heating the solution or dispersion of the anthraquinone body up to 120° C., whereby temperatures between 30° and 100° C. will be preferably used.

As solvents that can be used in the present process, water, sulphuric and hydrochloric acid of various concentrations, acetic acid, and others or mixtures thereof can be cited.

The quantity of aldehydes necessary for the condensation consists of one molecule thereof on two molecules of the anthraquinone body, but it is preferable to use a small excess of aldehyde, in order to complete the reaction in a shorter time. The products obtained according to the present process are, according to the starting products, soluble or insoluble in water. If it is intended to prepare water-soluble dyestuffs, water-soluble starting-products are used, or sulphonic acid groups are introduced into the condensation products by known methods, for example by direct sulphonation, or by replacement of an atom or of a replaceable group contained in the anthraquinone nucleus.

The compounds obtained as above described are, when they are soluble in water, very valuable dyestuffs which dye animal fibres in very fast shades. The dyeings obtained are fast to milling and possess an excellent stability towards light.

One object of the present invention is a process for the manufacture of anthraquinone dyestuffs consisting in treating arylaminoanthraquinones having in the aryl group a free 4'-position, with aldehydes.

Another object of the present invention is the process for treating the said anthraquinone bodies with aldehydes, which process consists in that the anthraquinone bodies are treated in form of solutions or of suspensions with aldehydes in a neutral or acid medium and preferably at a temperature of 30° to 100° C.

Further the present invention comprises the new condensation products obtained as above described, which are di- or triphenylmethane derivatives and constitute, when soluble in water, very valuable dyestuffs for animal fibres.

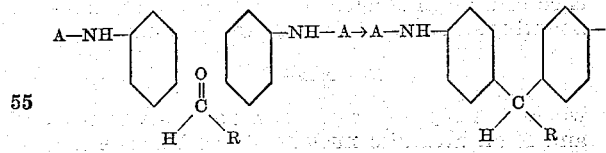

wherein A represents the anthraquinone nucleus and R a hydrogen, an aliphatic or an aromatic group.

The following examples, without being limitative, illustrate the present process, the parts being by weight:

Example 1

20 parts of 1-amino-2-sulpho-4-phenylaminoanthraquinone are suspended in 100 parts of sulphuric acid of 70% and 10 parts of benzaldehyde are added thereto. The mixture is then treated on a water bath until a test shows that the precipitate formed is insoluble in boiling water. The reaction mixture is then filtered, the precipitate washed with sulphuric acid of 70%. The condensation product is, thereupon, suspended in 500 parts of water, neutralized with sodium hydroxide, filtered and dried. The sodium salt of the dyestuff obtained in this manner is soluble in water and dyes wool from an acid bath in greenish-blue tints of excellent fastness to milling and to light.

By replacing in this example the benzaldehyde by 3- or 4-aminobenzaldehyde or by 4-dimethylaminobenzaldehyde, dyestuffs are obtained which possess a better levelling power.

Example 2

20 parts of 1-amino-2-methyl-4-phenylaminoanthraquinone are suspended in 200 parts of sulphuric acid of 80% and stirred at 60° C. with 11 parts of the sodium salt of benzaldehyde disulphonic acid. After a short time the condensation has taken place and the reaction product becomes soluble in water. The reaction mixture is then poured into water, filtered, the precipitate is suspended in water, neutralized and salted out. The dyestuff obtained dyes wool in grey-blue tints of excellent fastness to milling and to light.

Example 3

20 parts of 1-amino-2-sulpho-4-phenylaminoanthraquinone are suspended in 180 parts of sulphuric acid of 60% and stirred at 60° C. with 1 part of paraformaldehyde until the green solution is transformed into a Bordeaux-red suspension. The product thus obtained is then filtered, washed with sulphuric acid of 60% and transformed into the sodium salt in the usual manner. The dyestuff thus obtained dyes wool in greenish-blue tints of good fastness to milling, light and to potting.

A similar dyestuff is obtained when formaldehyde is replaced by 1.1 parts of acetaldehyde.

Example 4

10 parts of 1-amino-2-sulpho-4-(3'-chlorophenyl) aminoanthraquinone are stirred on a boiling water bath with 200 parts of water, 2 parts of formaldehyde (40%) and 2 parts of acetic acid, until a test shows that the aqueous solution does no more become greener. The dyestuff thus produced is then isolated in usual manner. It dyes wool in blue tints of good fastness to light and to milling.

In the same manner condensation products from 1-amino-2-sulpho-4-(2'-methoxy)- or -(3'-methyl)-phenylaminoanthraquinone may be obtained. The acetic acid used in this example can further be replaced by sulphuric, hydrochloric or formic acid.

Example 5

A suspension of 15 parts of carbethoxy-2-sulpho-4-phenylamino-1:9-anthrapyridone in 180 parts of sulphuric acid of 60% is heated at 60° C. under stirring with 0.5 parts of paraformaldehyde, until a test shows that the product is no more soluble in cold water. The precipitate is then filtered, neutralized and isolated in the usual manner by salting it out from its aqueous solution. It dyes wool in clear violet tints of good fastness to milling and to light.

Example 6

20 parts of 1-amino-4-phenylaminoanthraquinone are suspended in 180 parts of sulphuric acid of 70% and heated up to 60° C. with 1 part of paraformaldehyde. The condensation product thus obtained gives a greener shade in ethyl acetate than the starting product. It is isolated by filtration and sulphonated with weak oleum at 40° C. The dyestuff thus produced dyes wool in reddish-blue tints of excellent fastness to light and to milling.

Example 7

10 parts of 1-amino-4-phenylaminoanthraquinone-2-sulphonic acid, 200 parts of water and 2 parts of formaldehyde of 40% are heated for 24 hours under stirring on a water bath. After this time the dyestuff is formed and is isolated by salting out. It is identical with the dyestuff prepared according to Example 2.

The condensation of the sodium salt of the 1-amino-4-(3'-methylphenyl) aminoanthraquinone-2-sulphonic acid with formaldehyde can be carried out in the same manner.

Example 8

20 parts of 1-phenylaminoanthraquinone are dissolved in 150 parts of sulphuric acid of 80% and stirred at 60° C. during 1½ hours with 1.2 parts of paraformaldehyde. The reaction mixture is poured into 500 parts of water and the condensation product isolated by filtration.

By sulphonating it with oleum at 45° C., a dyestuff is obtained which dyes wool and silk in brown-red tints.

What I claim is:—

1. A process for the manufacture of anthraquinone compounds, consisting in treating with an aldehyde selected from the class consisting of aliphatic and aromatic aldehydes and in presence of a diluting agent arylaminoanthraquinones of the general formula

A—NH—R wherein A represents an anthraquinone nucleus and R an aromatic nucleus of the benzene and naphthalene series possessing a free para-position to the group —NH—.

2. A process for the manufacture of anthraquinone compounds, consisting in treating with an aldehyde selected from the class consisting of aliphatic and aromatic aldehydes and in presence of a diluting agent of acid nature arylaminoanthraquinones of the general formula

A—NH—R wherein A represents an anthraquinone nucleus and R an aromatic nucleus of the benzene and naphthalene series possessing a free para-position to the group —NH—.

3. A process for the manufacture of anthraquinone compounds, consisting in treating with an aldehyde and in presence of sulphuric acid arylaminoanthraquinones of the general formula

wherein A represents an anthraquinone nucleus and R an aromatic nucleus of the benzene and naphthalene series possessing a free para-position to the group —NH—.

4. A process for the manufacture of anthraquinone compounds, consisting in treating with an aldehyde and in presence of sulphuric acid of 40 to 100% strength arylaminoanthraquinones of the general formula

A—NH—R wherein A represents an anthraquinone nucleus and R an aromatic nucleus of the benzene and naphthalene series possessing a free para-position to the group —NH—.

5. A process for the manufacture of anthraquinone compounds, consisting in treating with an aldehyde at a temperature of 30° to 100° C. and in presence of sulphuric acid of 40 to 100% strength arylaminoanthraquinones of the general formula

A—NH—R wherein A represents an anthraquinone nucleus and R an aromatic nucleus of the benzene and naphthalene series possessing a free para-position to the group —NH—.

6. A process for the manufacture of anthraquinone compounds, consisting in treating with an aldehyde at a temperature of 30° to 100° C. and in presence of sulphuric acid of 40 to 100% strength arylaminoanthraquinones of the general formula

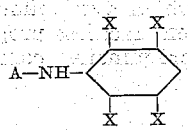

wherein A represents an anthraquinone nucleus and X represents hydrogen, alkyl, alkoxy, acyl-amino, halogen and sulpho groups.

7. A process for the manufacture of anthraquinone compounds, consisting in treating with an aldehyde at a temperature of 30° to 100° C. and in presence of sulphuric acid of 40 to 100% strength arylaminoanthraquinones of the general formula

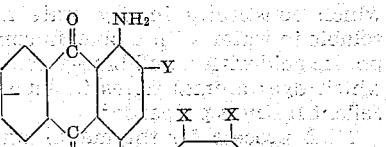

wherein Y represents hydrogen, alkyl, alkoxy, halogen, cyano and sulpho, Z represents hydrogen, halogen, hydroxy, alkoxy, amino, acyl-amino and sulpho, and X represents hydrogen, alkyl, alkoxy, acyl amino, halogen and sulpho groups.

8. A process for the manufacture of anthraquinone compounds, consisting in treating with an aldehyde at a temperature of 30° to 100° C. and in presence of sulphuric acid of 40 to 100% strength arylaminoanthraquinones of the general formula

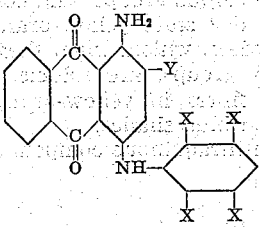

wherein Y represents hydrogen, alkyl, alkoxy, halogen, cyano and sulpho and X represents hydrogen, alkyl, alkoxy, acyl amino, halogen and sulpho groups.

9. A process for the manufacture of anthraquinone compounds, consisting in treating with an aldehyde at a temperature of 30° to 100° C. and in presence of sulphuric acid of 40 to 100% strength an arylaminoanthraquinone of the formula

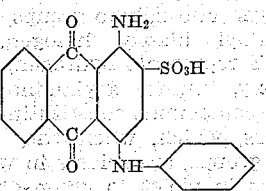

10. A process for the manufacture of an anthraquinone dyestuff, consisting in treating 1-amino-4-phenylaminoanthraquinone-2-sulphonic acid with formaldehyde at a temperature of 30° to 100° C. and in presence of sulphuric acid of 40-100% strength.

11. A process for the manufacture of an anthraquinone dyestuff, consisting in treating 1-amino-4-phenylaminoanthraquinone-2-sulphonic acid with acetaldehyde at a temperature of 30° to 100° C. and in presence of sulphuric acid of 40-100% strength.

12. A process for the manufacture of an anthraquinone dyestuff, consisting in treating 1-amino-4-phenylaminoanthraquinone-2-sulphonic acid with 3-aminobenzaldehyde at a temperature of 30°-100° C. and in presence of sulphuric acid of 40-100% strength.

13. The anthraquinone compounds of the general formula $$A-NH-R-\overset{H}{\underset{B}{C}}-R-NH-A$$

wherein A represents an anthraquinone nucleus, R represents an aryl nucleus of the benzene and naphthalene series and B represents hydrogen, alkyl and aryl, said compounds constituting in dry state yellow orange, red, violet to dark powders, which, when they contain sulphonic acid groups, are soluble in water and dye animal fibres in yellow-orange, red-violet, blue to green-blue shades.

14. The anthraquinone compounds of the general formula

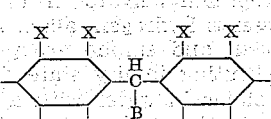

wherein A represents an anthraquinone nucleus,

B represents hydrogen, alkyl and aryl and X represents hydrogen, alkyl, alkoxy, acylamino, halogen and sulpho groups, said compounds constituting in dry state yellow-orange, red violet to dark powders, which, when they contain sulphonic acid groups, are soluble in water and dye animal fibres in yellow-orange, red-violet, blue to green-blue shades.

15. The anthraquinone compounds of the general formula

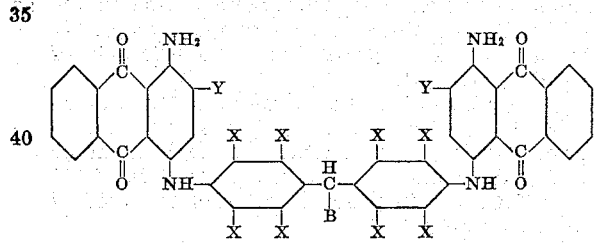

wherein B represents hydrogen, alkyl and aryl, X represents hydrogen, alkyl, alkoxy, substituted amino, halogen and sulpho groups, Y represents hydrogen, alkyl, alkoxy, halogen, cyano and sulpho and Z represents hydrogen, halogen, hydroxy, alkoxy, amino, acylamino and sulpho groups, said compounds constituting in dry state dark powders, which, when they contain sulphonic acid groups, are soluble in water and dye animal fibres in violet to green-blue shades of excellent fastness properties.

16. The anthraquinone compounds of the general formula

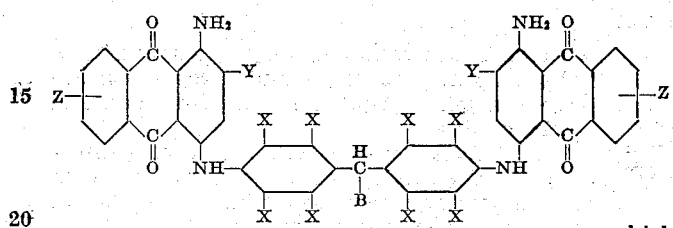

wherein B represents hydrogen, alkyl and aryl, X represents hydrogen, alkyl, alkoxy, acylamino, halogen and sulpho groups and Y represents hydrogen, alkyl, alkoxy, halogen, cyano and sulpho groups, said compounds constituting in dry state dark powders which, when they contain sulphonic acid groups are soluble in water and dye animal fibres in violet to green blue shades of excellent fastness properties.

17. The anthraquinone compounds of the general formula

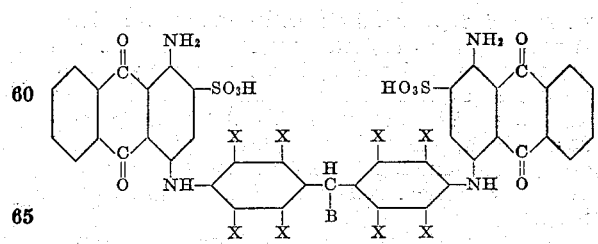

wherein B represents hydrogen, alkyl and aryl and X represents hydrogen, alkyl, alkoxy, acylamino, halogen and sulpho groups, said compounds constituting in dry state dark powders which are soluble in water with a blue coloration and dye animal fibres in reddish-blue to greenish-blue shades of excellent fastness properties.

18. The anthraquinone compound of the formula

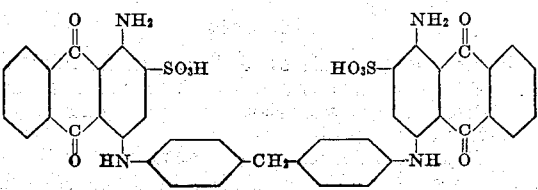

which constitutes in dry state a dark powder, soluble in water with a greenish-blue and in concentrated sulphuric acid with a dull blue-green coloration and which dyes animal fibres in blue shades of excellent fastness properties.

19. The anthraquinone compound of the formula

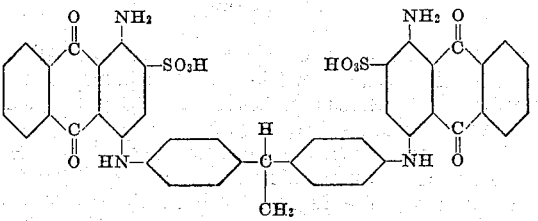

which constitutes in dry state a dark powder soluble in water with a greenish-blue and in concentrated sulphuric acid with a greyish-green coloration and which dyes animal fibres in blue shades of excellent fastness properties.

20. The anthraquinone compound of the formula

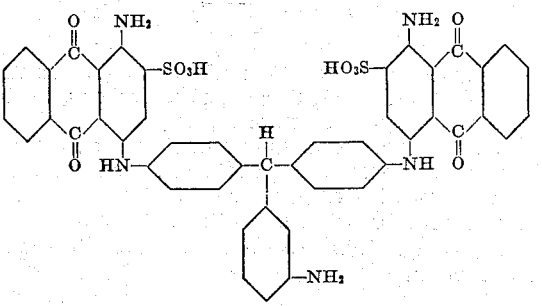

which constitutes in dry state a dark powder soluble in water with a blue, in concentrated sulphuric acid with a dull blue-green coloration and which dyes animal fibres in blue shades of excellent fastness properties.

21. A process for the manufacture of anthraquinone dye compounds, consisting in treating with an aldehyde at a temperature of 30° to 100° C. and in presence of sulphuric acid of 40 to 100% strength arylaminoanthraquinones of the general formula

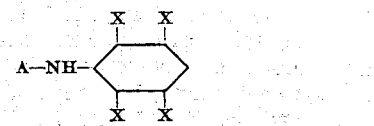

wherein A represents an anthraquinone nucleus and X represents a shade modifying substituent selected from the group consisting of hydrogen, alkyl, alkoxy, acylamino, halogen and sulpho groups.

22. A process for the manufacture of anthraquinone dye compounds, consisting in treating with an aldehyde at a temperature of 30° to 100° C. and in presence of sulphuric acid of 40 to 100% strength arylaminoanthraquinones of the general formula

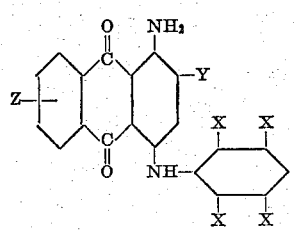

wherein Y represents a shade modifying substituent selected from the group consisting of hydrogen, alkyl, alkoxy, halogen, cyano and sulpho, Z represents a shade modifying substituent selected from the group consisting of hydrogen, halogen, hydroxy, alkoxy, amino, acylamino and sulpho, and X represents a shade modifying substituent selected from the group consisting of hydrogen, alkyl, alkoxy, acylamino, halogen and sulpho groups.

23. A process for the manufacture of anthraquinone dye compounds, consisting in treating with an aldehyde at a temperature of 30° to 100° C. and in presence of sulphuric acid of 40 to 100% strength arylaminoanthraquinones of the general formula

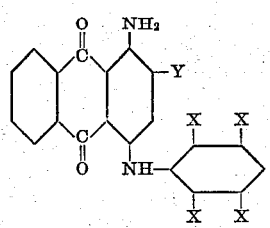

wherein Y represents a shade modifying substituent selected from the group consisting of hydrogen, alkyl, alkoxy, halogen, cyano and sulpho and X represents a shade modifying substituent selected from the group consisting of hydrogen, alkyl, alkoxy, acylamino, halogen and sulpho groups.

24. The anthraquinone dye compounds of the general formula

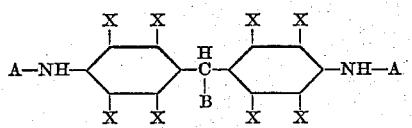

wherein A represents an anthraquinone nucleus, B represents hydrogen, alkyl and aryl and X represents a shade modifying substituent selected from the group consisting of hydrogen, alkyl, alkoxy, acylamino, halogen and sulpho groups, said compounds constituting in dry state yellow-orange, red violet to dark powders, which, when they contain sulphonic acid groups, are soluble in water and dye animal fibres in yellow-orange, red-violet, blue to green-blue shades.

25. The anthraquinone dye compounds of the general formula

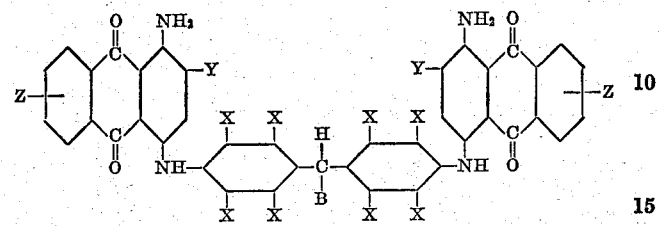

wherein B represents hydrogen, alkyl and aryl, X represents a shade modifying substituent selected from the group consisting of hydrogen, alkyl, alkoxy, substituted amino, halogen and sulpho groups, Y represents a shade modifying substituent selected from the group consisting of hydrogen, alkyl, alkoxy, halogen, cyano and sulpho and Z represents a shade modifying substituent selected from the group consisting of hydrogen, halogen, hydroxy, alkoxy, amino, acylamino and sulpho groups, said compounds constituting in dry state dark powders, which, when they contain sulphonic acid groups, are soluble in water and dye animal fibres in violet to green-blue shades of excellent fastness properties.

26. The anthraquinone dye compounds of the general formula

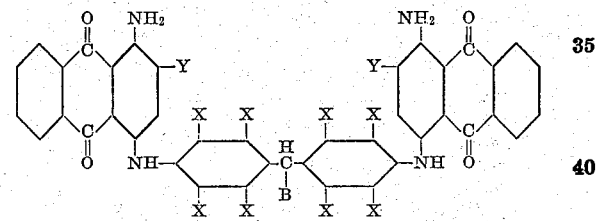

wherein B represents hydrogen, alkyl and aryl, X represents a shade modifying substituent selected from the group consisting of hydrogen, alkyl, alkoxy, acylamino, halogen and sulpho groups and Y represents a shade modifying substituent selected from the group consisting of hydrogen, alkyl, alkoxy, halogen, cyano and sulpho groups, said compounds constituting in dry state dark powders which, when they contain sulphonic acid groups are soluble in water and dye animal fibres in violet to green-blue shades of excellent fastness properties.

27. The anthraquinone dye compounds of the general formula

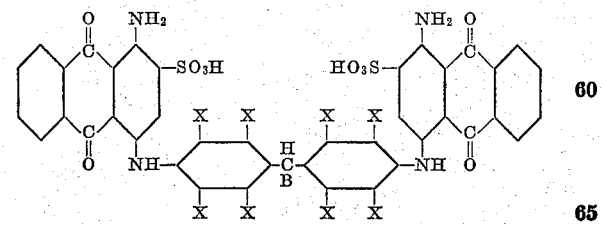

wherein B represents hydrogen, alkyl and aryl and X represents a shade modifying substituent selected from the group consisting of hydrogen, alkyl, alkoxy, acylamino, halogen and sulpho groups, said compounds constituting in dry state dark powders which are soluble in water with a blue coloration and dye animal fibres in reddish-blue to greenish-blue shades of excellent fastness properties.

ALBIN PETER.